United States Patent
Nakabayashi

(10) Patent No.: US 8,341,755 B2
(45) Date of Patent: Dec. 25, 2012

(54) IMAGE FORMING APPARATUS

(75) Inventor: Masahiro Nakabayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 940 days.

(21) Appl. No.: 12/071,819

(22) Filed: Feb. 27, 2008

(65) Prior Publication Data
US 2008/0216155 A1 Sep. 4, 2008

(30) Foreign Application Priority Data
Mar. 2, 2007 (JP) ................................ 2007-052220

(51) Int. Cl.
G06F 21/00 (2006.01)
(52) U.S. Cl. ........................................................ 726/27
(58) Field of Classification Search .............. 726/27–31, 726/2
See application file for complete search history.

(56) References Cited

U.S. PATENT DOCUMENTS

| | | | |
|---|---|---|---|
| 7,325,052 B1 * | 1/2008 | Motoyama | 709/223 |
| 7,367,060 B2 * | 4/2008 | Someshwar | 726/27 |
| 2002/0113993 A1 * | 8/2002 | Reddy | 358/1.15 |
| 2003/0154395 A1 * | 8/2003 | Miura et al. | 713/200 |
| 2005/0021398 A1 * | 1/2005 | McCleskey et al. | 705/14 |
| 2005/0268343 A1 * | 12/2005 | Onoda et al. | 726/26 |
| 2006/0221375 A1 * | 10/2006 | Nagarajan et al. | 358/1.14 |
| 2006/0221384 A1 * | 10/2006 | Tanaka | 358/1.15 |
| 2006/0253910 A1 * | 11/2006 | Yamamichi et al. | 726/31 |
| 2007/0002338 A1 * | 1/2007 | Kim | 358/1.1 |
| 2007/0103714 A1 * | 5/2007 | Ushiku | 358/1.14 |
| 2007/0250924 A1 * | 10/2007 | Ono et al. | 726/19 |
| 2009/0009802 A1 * | 1/2009 | Shaw et al. | 358/1.15 |

FOREIGN PATENT DOCUMENTS

JP 2005-062231 3/2005

* cited by examiner

Primary Examiner — Kim Vu
Assistant Examiner — John B King
(74) Attorney, Agent, or Firm — Rabin & Berdo, P.C.

(57) ABSTRACT

An image forming apparatus is provided that is capable of preventing a print data from being leaked even where a user forgets to print out the print data with which an authentication data is attached. The image forming apparatus of the present invention has: a network interface receiving the print data, the authentication data, and an importance degree data; a hard disk drive storing the print data, the authentication data, and the importance degree data received by the network interface; an operation panel with which the user inputs the authentication data that is used to authenticate the print data; an authentication control unit comparing the authentication data stored in the hard disk drive with the authentication data input by the user; a control comprising a print processing unit controlling print processing of the print data stored in the hard disk drive based on the comparison result; and a time management unit measuring a time for which the print data is stored in the hard disk drive, wherein the control unit deletes the print data based on the importance degree data and the time for which the print data is stored in the hard disk drive.

5 Claims, 13 Drawing Sheets

AUTHENTICATION DATA

PRINT DATA

FIG. 2

| IMPORTANCE DEGREE DATA | AUTHENTICATION DATA | PRINT DATA |
|---|---|---|
| HIGH | 0513 | |
| MIDDLE | 1218 | |
| ⋮ | ⋮ | |

FIG. 3

| DEGREE OF IMPORTANCE | DATA DELETION CRITERIA |
|---|---|
| LOW | THE PRINT DATA IS DELETED RIGHT AFTER THE PRINT DATA IS PRINTED. |
| MIDDLE | THE PRINT DATA IS DELETED 60 MINUTES AFTER THE PRINT DATA IS RECEIVED. |
| HIGH | THE PRINT DATA IS DELETED 5 MINUTES AFTER THE PRINT DATA IS RECEIVED. |

FIG. 4

| DEGREE OF IMPORTANCE | DATA DELETION CRITERIA |
|---|---|
| LOW | THE PRINT DATA IS STORED IN THE HDD, AND IS DELETED RIGHT AFTER THE PRINT DATA IS PRINTED. |
| MIDDLE | THE PRINT DATA IS STORED IN THE HDD, AND IS DELETED 60 MINUTES AFTER THE PRINT DATA IS RECEIVED. |
| HIGH | THE PRINT DATA IS STORED IN THE RAM, AND IS DELETED 5 MINUTES AFTER THE PRINT DATA IS RECEIVED. |

FIG. 6

| DEGREE OF IMPORTANCE | DATA DELETION CRITERIA |
|---|---|
| LOW | THE PRINT DATA IS ALLOWED TO BE PRINTED ANY NUMBER OF TIMES. |
| MIDDLE | THE PRINT DATA IS ALLOWED TO BE PRINTED 5 TIMES. |
| HIGH | THE PRINT DATA IS ALLOWED TO BE PRINTED ONLY ONCE. |

FIG. 9

| IMPORTANCE DEGREE DATA | AUTHENTICATION DATA | PRINT DATA | ALLOWABLE NUMBER OF TIMES OF PRINTING OF THE PRINT DATA |
|---|---|---|---|
| HIGH | 0513 | | 1 |
| MIDDLE | 1218 | | 5 |
| LOW | 2345 | | 0FFFFh |
| ⋮ | ⋮ | | ⋮ |

FIG. 11

IMAGE FORMING APPARATUS

BACKGROUND OF THE INVENTION

1. Field of the Invention

The present invention relates to an image forming apparatus.

2. Description of Related Art

To reduce the risk of leaking printed information, there exists a host, server, and image forming apparatus with an authentication function that compares authentication information attached to a print data with authentication information input by a user and does not allow the print data to be printed unless both authentication information corresponds to each other. For example, an image forming apparatus with such an authentication function is disclosed in Japanese Un-examined Patent Application Publication No. 2005-62231.

Specifically, Japanese Un-examined Patent Application Publication No. 2005-62231 discloses an image forming apparatus capable of protecting the usage of functions of the image forming apparatus and the print data stored in the image forming apparatus by employing different authentication methods depending on the importance degree of the functions provided with the image forming apparatus and the data stored in the image forming apparatus.

However, the image forming apparatus described above temporarily stores the print data in the image forming apparatus until a user is authenticated, and thus, in a case such as where the user forgets to print out the print data or where the image forming apparatus itself is stolen, the print data is left stored in the image forming apparatus to result in a problem that the print data is leaked.

SUMMARY OF THE INVENTION

This invention is made in consideration of such problems, and it is an object of the present invention to provide an image forming apparatus capable of preventing the print data from being leaked even where the user forgets to print the print data having an authentication data attached thereto.

To solve the above problem, the image forming apparatus of the present invention with an authenticated printing function has: a data input unit allowing input of a print data, a first authentication data authenticating the print data, and an attribute data of the print data; a memory unit memorizing the print data, the first authentication data, and the attribute data input with the data input unit; an authentication data input unit allowing input of a second authentication data authenticating the print data; an authentication data comparison unit comparing the first authentication data memorized in the memory unit with the second authentication data input with the authentication data input unit; a control unit controlling a print processing of the print data memorized in the memory unit based on a comparison result of the authentication data comparison unit; and a timer unit measuring a time for which the memory unit memorizes the print data, wherein the control unit deletes the print data from the memory unit based on the attribute data memorized in the memory unit and the time measured by the timer.

The image forming apparatus thus structured causes the control unit to delete the print data from the memory unit where a certain criteria is satisfied regardless of whether the apparatus performs print processing or not. That is, for example, where the user inputs the print data of a confidential document to the image forming apparatus but thereafter forgets to perform an authenticated printing of the print data, the image forming apparatus of the present invention can have the control unit delete the print data from the memory unit based on input attribute information and time measured by the timer unit. Thus, the image forming apparatus prevents a printed confidential document or the print data of a confidential document from being leaked to outside.

As described above, the image forming apparatus of the present invention can prevent the print data from being leaked even where the user forgets to print the print data or where the image forming apparatus itself is stolen.

DETAILED DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein:

FIG. 2 is a block diagram of a print data to be transmitted to the image forming apparatus for explanation of the structure of the print data;

FIG. 3 is a table showing an example of the print data, an authentication data, and an importance degree data associated with each other and memorized to be transmitted to the image forming apparatus;

FIG. 4 is a table showing an example of data deletion criteria that the image forming apparatus uses to determine a processing method of the print data;

FIG. 6 is a table showing an example of data deletion criteria that the image forming apparatus of the second embodiment uses to determine the processing method of the print data;

FIG. 9 is a table showing an example of data deletion criteria that the image forming apparatus of the third embodiment uses to determine the processing method of the print data;

FIG. 11 is a table showing an example of the print data, the authentication data, and the importance degree data associated with each other and memorized to be transmitted to the image forming apparatus of the third embodiment;

PREFERRED EMBODIMENTS

First Embodiment

Figure 1:
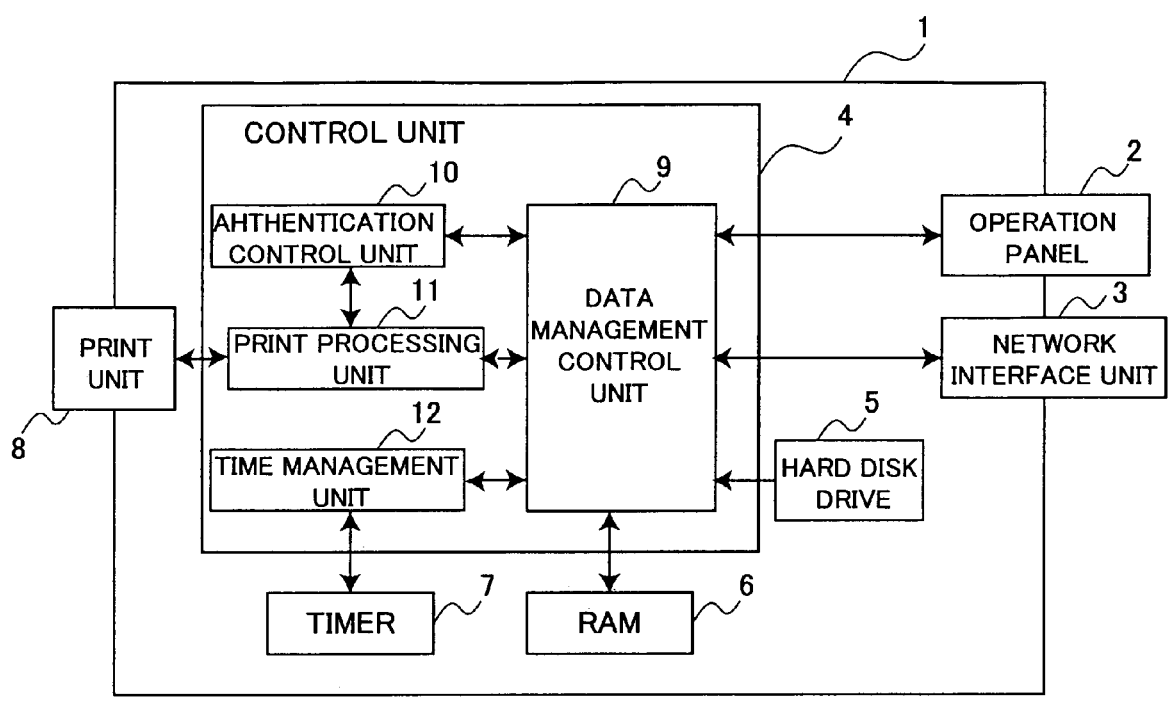
FIG. 1 is a block diagram showing an image forming apparatus according to the first embodiment of the invention for explanation of the structure thereof.

Embodiments according to the present invention are hereinafter described in detail with reference to the figures.

An image forming apparatus in the embodiments has an authentication function comparing an authentication data attached to a print data and an authentication data input by a user, for example, with an operation panel of the image forming apparatus and performing printing of the print data only where both authentication data correspond to or agree with each other. Where the image forming apparatus performs an authenticated printing using the authentication function, the image forming apparatus determines a processing method of the print data based on an attribute data input with the print data, and executes the processing method regardless of whether the user performs the authentication function. Therefore, in a case where, for example, the user forgets to execute the authenticated printing, the image forming apparatus can process the print data, thus preventing leaking of printed document on which the print data is printed with the authenticated printing and preventing the print data from being leaked by performing the processing of the print data. The embodiments according to the present invention are hereinafter described in detail.

The image forming apparatus according to the first embodiment of the invention has an authenticated printing function and comprises: a data input unit allowing input of a print data, a first authentication data authenticating the print data, and an attribute data of the print data; a memory unit memorizing the print data, the first authentication data, and the attribute data input with the data input unit; an authentication data input unit allowing input of a second authentication data authenticating the print data; an authentication data comparison unit comparing the first authentication data memorized in the memory unit with the second authentication data input with the authentication data input unit; a control unit controlling a print processing of the print data memorized in the memory unit based on a comparison result of the authentication data comparison unit; and a timer unit measuring a time for which the memory unit memorizes the print data, wherein the control unit deletes the print data from the memory unit based on the attribute data memorized in the memory unit and the time, measured by the timer, for which the memory unit memorizes the print data regardless of whether the user performs the authenticated printing. The attribute data input to the image forming apparatus is information that the user attaches to the print data according to importance degree of the print data, and specifically, includes information as to a maximum length of time for which the memory unit memorizes the print data. The image forming apparatus deletes the print data after the time designated by the attribute data for the deletion of the print data passes even where the user forgets to perform the authenticated printing, thus preventing the print data from being left stored in the image forming apparatus and preventing the print data from being leaked.

As shown in FIG. 1, an image forming apparatus 1 has an operation panel unit 2 with which a user inputs various information, a network interface (I/F) unit 3 via which various information is input from a network, a control unit 4 performing an authentication function, a hard disk drive (HDD) 5, a RAM (Random Access Memory) 6, a timer 7 measuring time, and a print unit 8 printing on a recording medium such as paper an image based on a print data. The image forming apparatus 1 as described above stores in the HDD 5 the print data received by the network interface unit 3. The image forming apparatus 1 causes the control unit 4 to perform an authentication function when the user inputs an authentication data with the operation panel unit 2, and based on a result of performing of the authentication function, reads out the print data stored in the HDD 5 and causes the print unit 8 to print the print data.

The operation panel unit 2 is, for example, an operation panel arranged on the image forming apparatus 1, and has a display unit, not shown, such as an LCD (Liquid Crystal Display), and an input unit, not shown, such as a ten key. The user inputs the authentication data with the operation panel unit 2 as described above. Upon the input of the authentication data by the user, the authentication data is supplied to the control unit 4.

The network interface unit 3 is, for example, an interface arranged on the image forming apparatus 1 and connected to an information processing apparatus, not shown, via the network. The network interface unit 3 receives the print data, an importance degree data as an attribute information showing the importance degree of the print data, and the authentication data for authenticating the print data from the information processing apparatus, not shown, via the network. The embodiments are described in detail assuming that the data input unit is a network interface, but a parallel interface or a serial interface can also be used as the data input unit.

The importance degree data shows the importance degree of the print data determined by the user at the information processing apparatus, not shown, and is used to classify how the print data should be handled in the image forming apparatus 1. Herein, the embodiments are described in detail assuming that the importance degree data is classified into three levels, namely, high, middle, and low, but classification of the importance degree data and the number of classifications can be arbitrary changed.

Figure 2:
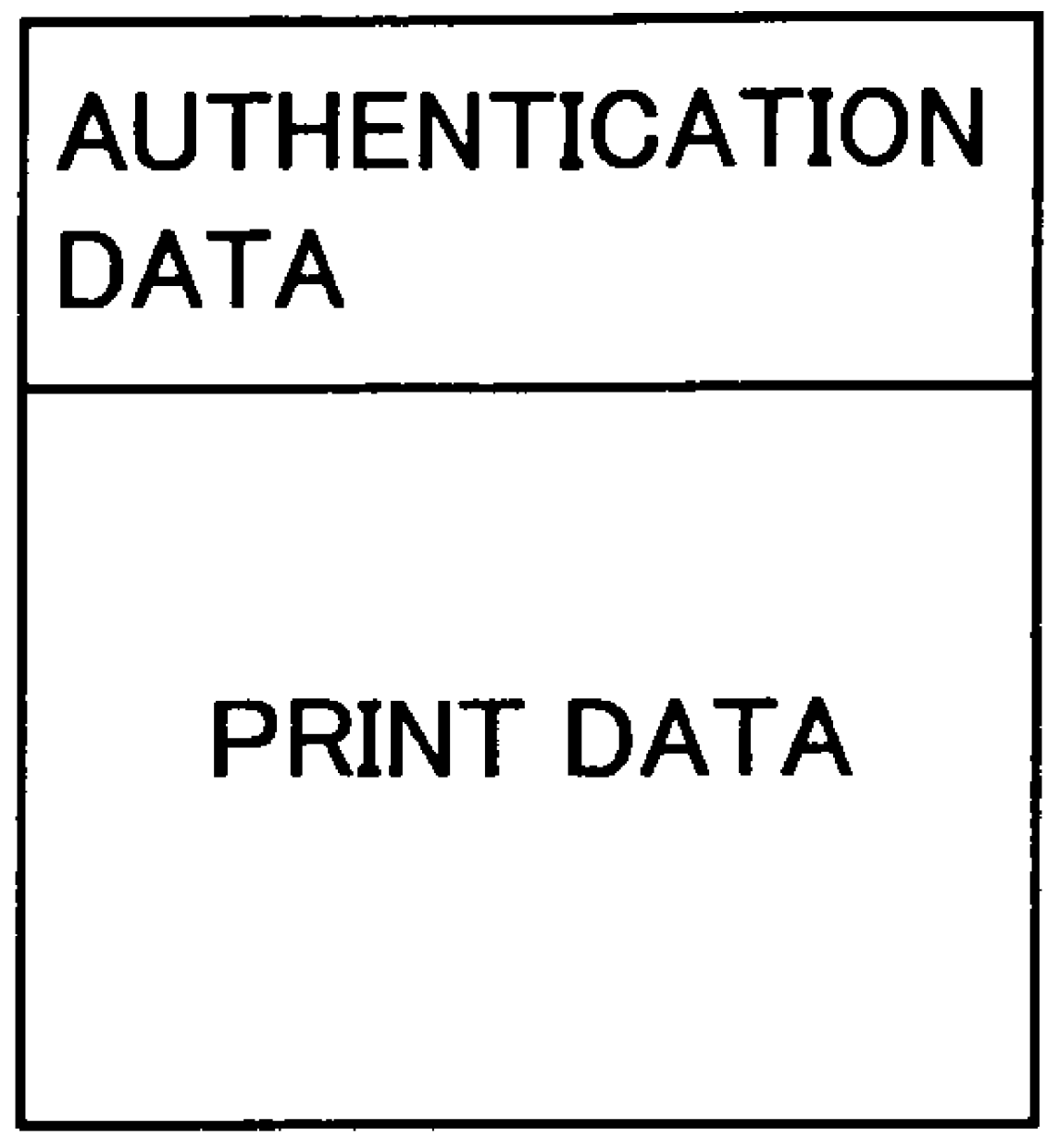

The authentication data attached to the print data is information expressed with, for example, a four-digit number, and is information that the user has attached to a header of the print data at the image processing apparatus as shown in FIG. 2. The authentication data distinguishes the print data from other print data and is used to perform the authenticated printing. Where the user inputs the authentication data with the operation panel unit 2 when printing the print data, the image forming apparatus 1 searches for the print data having the authentication data agreeing with the authentication data input by the user with the operation panel unit 2, and prints the print data having authentication data agreeing therewith. The embodiments are hereinafter described in detail assuming that the authentication data consists of a four-digit number, but the authentication data is not limited thereto, and the number of digits and the like of the authentication data is arbitrary changed.

The control unit 4 manages the print data, the importance degree data, and the authentication data, and performs the authentication function and a conversion processing of the print data. The control unit 4 has a data management control unit 9 managing the print data, the importance degree data, and the authentication data, an authentication control unit 10 comparing the authentication data input with the operation panel unit 2 with the authentication data attached to the print data, a print processing unit 11 performing the conversion processing of the print data, and a time management unit 12 reading a time measured by the timer 7 and managing the time.

The data management control unit 9 manages the print data, the importance degree data, and the authentication data. Specifically, the data management control unit 9 stores in the HDD 5 the print data, the authentication data, and the importance degree data received by the network interface unit 3 as a table shown in FIG. 3. The data management control unit 9 determines the processing method of the print data by configuring a time management register for each of the print data based on the importance degree data, and the time management register stores information as to how soon the print data should be deleted. The data management control unit 9 configures the time management register for the print data based on a data deletion criteria as shown in FIG. 4. The time management register is a memory area allotted on the HDD 5, and, for example, where the importance degree data is "high", the data management control unit 9 looks up the data deletion criteria and sets the time management register for the print data to "n=5 minutes" corresponding to the importance degree data. The value n shows how soon the print data should be deleted, and after a time in the time management register passes since the reception of the print data, the print data having the configured time management register is deleted regardless of whether the authenticated printing is performed. Alternatively, for example, where the importance degree data is "middle", the data management control unit 9 sets the time management register of the print data to "n=60 minutes" corresponding to the importance degree data. Alternatively, for example, where the importance degree data is "low", the data management control unit 9 keeps a default value "n=0 minute" in the time management register of the print data because the print data corresponding to the importance degree data "low" is not affected by an elapsed time after the reception of the print data.

The data management control unit 9 performs the processing of the print data according to the determined processing method of the print data. That is, the image forming apparatus 1 deletes the print data based on the configured time management register by having the data management control unit 9 delete the print data stored in the HDD 5 after the time in the time management register passes.

Where the user inputs the authentication data with the operation panel unit 2 and the data management control unit 9 detects this input, the data management control unit 9 supplies the authentication data input by the user with the authentication control unit 10 so that the authentication information is compared. At the same time, the data management control unit 9 sequentially reads out the authentication data from the HDD 5, and supplies the read authentication data to the authentication control unit 10. When performing printing, the data management control unit 9 reads out the print data from the HDD 5, and supplies the read print data to the print processing unit 11. A CPU (Central Processing Unit), not shown, performs a series of operations of the data management control unit 9 by performing a program stored in a ROM (Read Only Memory), not shown.

The authentication control unit 10 compares the authentication data input by the user to the operation panel unit 2 and supplied by the data management control unit 9 with the authentication data associated with the print data and stored in the HDD 5. Where both authentication data do not agree with each other, the authentication control unit 10 compares the authentication data sequentially supplied by the data management control unit 9 with the authentication data input by the user with the operation panel unit 2. Where both authentication data agree with each other, the authentication control unit 10 notifies the print processing unit 11 to that effect and also notifies the print processing unit 11 of the content of the authentication data.

The print processing unit 11 performs the processing of converting the print data into a format printable by the print unit 8, and controls various units when the image forming apparatus 1 performs printing operation. Specifically, upon notification from the authentication control unit 10, the print processing unit 11 requests the data management control unit 9 to send the print data associated with the authentication data notified by the authentication control unit 10 to the print processing unit 11. In response, the data management control unit 9 looks up the authentication data, reads out the print data associated with the authentication data and stored in the HDD 5, and supplies the print data to the print processing unit 11. Then, the print processing unit 11 performs the processing to convert the print data into the format printable by the print unit 8. Then, the print processing unit 11 controls operation of the print unit 8 based on the print data.

The time management unit 12 notifies the data management control unit 9 that the time shown by the time management register passes based on the time measured by the timer 7 and the time management register. Specifically, where the print data is stored in the HDD 5 and the value in the time management register is not "0", the time management unit 12 configures a software time counter in the HDD 5 to measure the time for which the print data is stored in the HDD 5. The time management unit 12 increases the value in the software time counter according to an elapsed time measured by the timer 7. Every time the software time counter is increased, the time management unit 12 compares the software time counter with the time management register, and where the value in the software time counter exceeds the value in the time management register, the time management unit 12 sets an interrupt flag in the data management control unit 9. Where the flag is set up by the time management unit 12, the data management control unit 9 deletes the print data stored in the HDD 5.

The timer 7 may be a real time clock backed up, for example, by a battery, not shown, to be able to work even where the image forming apparatus 1 is turned off, and the time management unit 12 may read out a current date and time managed by the timer 7. In this case, the time management register does not store a value as to how many minutes later the print data should be deleted but stores a real date and time at which the print data is scheduled to be deleted, and thus, even where the date and time in the time management register comes while the image forming apparatus 1 is turned off, the employment of the real time clock as the timer 7 enables the print data to be deleted based on the time management register and the current date and time supplied by the real time clock when the image forming apparatus 1 is turned on next time. Specifically, when the image forming apparatus 1 is turned on next time, the time management unit 12 compares the current date and time supplied by the timer 7 with the date and time in the time management register to determine whether the print data should be deleted then. Alternatively, instead of the real time clock, the timer 7 may have a time adjustment method such as SNTP (Simple Network Time Protocol) or NTP (Network Time Protocol). Where SNTP or NTP is employed for the timer 7, the timer 7 enables the print data to be deleted in synchronization with other apparatuses on the network without needing the real time clock backed up by a battery in the image forming apparatus 1.

The print unit 8 is driven based on the print data whose data format has been converted by the print processing unit 11, and the print unit 8 prints a developer image based on the print data onto paper serving as a recording medium. The print unit 8 driven under the control of the print processing unit 11 discharges the paper having thereon the image based on the print data to outside of the image forming apparatus 1 to provide the user with the paper on which the print data has been printed.

Figure 5:
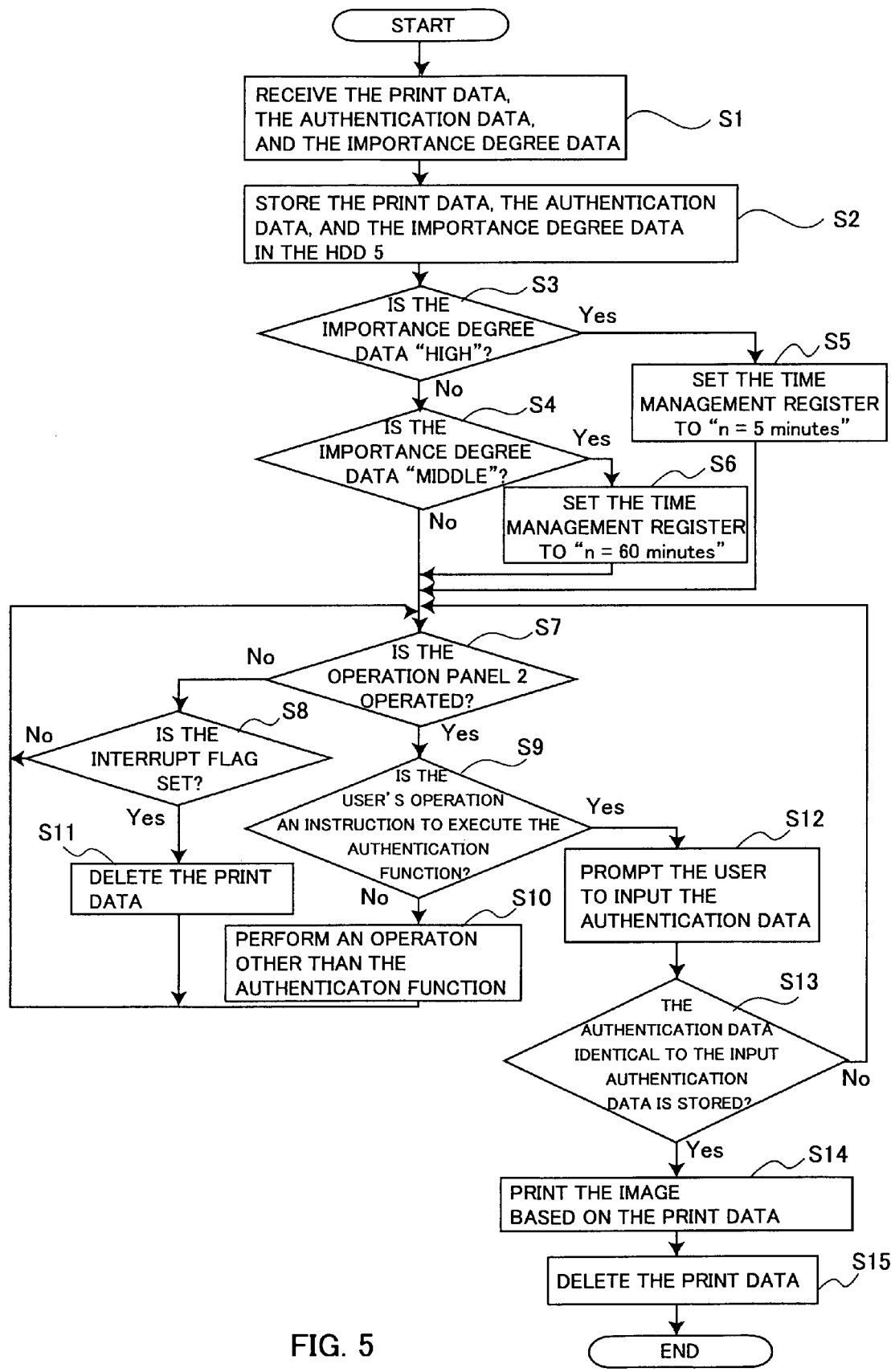
FIG. 5 is a flow chart showing operation of the image forming apparatus.

Operation of the image forming apparatus 1 is hereinafter described in detail with reference to FIG. 5.

The user generates the print data at the image processing apparatus, not shown, attaches the authentication data to the print data, configures the importance degree data of the print data, and transmits the print data, the authentication data, and the importance degree data to the image forming apparatus 1. Then, the image forming apparatus 1 starts a series of operations, and receives the print data, the authentication data, and the importance degree data via the network interface unit 3 at step S1. Subsequently, the image forming apparatus 1 performs operations of step S2 and subsequent steps to process the print data, the authentication data, and the importance degree data.

At step S2, the image forming apparatus 1 causes the data management control unit 9 to store in the HDD 5 the print data, the authentication data, and the importance degree data that the network interface unit 3 has received. Specifically, the data management control unit 9 retrieves the print data, the authentication data, and the importance degree data from the network interface unit 3 and writes the retrieved data to the HDD 5. Subsequently, the image forming apparatus 1 performs step S3 and subsequent steps to determine the processing method of the print data.

Subsequently, the image forming apparatus 1 determines the processing method of the print data by analyzing actual content of the importance degree data and configuring the time management register for the print data.

Specifically, at step S3, the data management control unit 9 determines whether the importance degree data corresponding to the received print data is "high". If the data management control unit 9 determines that the importance degree data is not "high", the data management control unit 9 determines whether the importance degree data is "middle" at step S4. If the importance degree data is "high", the data management control unit 9 looks up the data deletion criteria and sets the time management register for the print data to "n=5 minutes" at step S5. If the importance degree data is "middle", the data management control unit 9 looks up the data deletion criteria and sets the time management register for the print data to "n=60 minutes" at step S6. Where the time management register is set at step S5 or step S6, the time management unit 12 configures the above-mentioned software time counter and starts counting elapsed time by periodically increasing the software time counter. Subsequently, the image forming apparatus 1 performs steps S7 and subsequent steps to perform printing of the print data and the like. It should be noted that the time management register configured for the print data is "n=5 minutes" where the importance degree data is "high", "n=60 minutes" where the importance degree data is "middle", and "n=0 minute" where the importance degree data is "low".

At step S7, the data management control unit 9 determines whether the operation panel unit 2 is operated by the user. If the data management control unit 9 determines that the operation panel unit 2 is not operated, the data management control unit 9 determines at step S8 whether the interruption flag is set by the time management unit 12. If the data management control unit 9 determines that the interrupt flag is not set, step S7 is repeated again, and the above-mentioned steps are repeated unless the user operates the operation panel unit 2 or the time management unit 12 sets the interrupt flag.

Where the user operates the operation panel unit 2 to input a prescribed information to the image forming apparatus 1, the data management control unit 9 determines that the operation panel unit 2 is operated at step S7, and performs step S9 and subsequent steps.

At step S9, the data management control unit 9 determines whether the user's operation is to instruct the execution the authentication function. If the data management control unit 9 determines that the user's operation with the operation panel unit 2 is not an instruction for executing the authentication function, the apparatus performs an operation other than the execution of the authentication function in accordance with the user's instruction at step S10, and then performs the operation of step S7 again.

If the data management control unit 9 determines that the interruption flag is set by the time management unit 12 at step S8, the data management control unit 9 deletes the print data, the authentication data, and the importance degree data from the HDD 5 according to the data deletion criteria at step S11. Even though the user has not yet manipulated the image forming apparatus 1 until step 8, the image forming apparatus 1 spontaneously deletes the print data based on the importance degree data regardless of whether the print data has been printed or not, thus preventing the print data from being leaked even where the user forgets about the existence of the print data.

If the data management control unit 9 determines that the user's operation is an instruction for executing the authentication function at step S9, the data management control unit 9 notifies the authentication control unit 10 to that effect and prompts the user to input the authentication data at step S12. The data management control unit 9 displays a prescribed message on the display unit of the operation panel unit 2 to prompt the user to input the authentication data. The authentication data input to the operation panel unit 2 here is supplied to the authentication control unit 10 by the data management control unit 9.

The data management control unit 9 determines whether the HDD 5 stores the authentication data identical to the authentication data input to the operation panel unit 2 at step S13. If the print data is already deleted at step S11 or if the user fails to input the correct authentication data, the data management control unit 9 determines that the HDD 5 does not store the authentication data identical to the authentication data that the user inputs. In such cases, the image forming apparatus 1 cannot identify the print data to be printed, and thus, exits the authentication mode and repeats step S7 again.

On the other hand, if the data management control unit 9 determines at step S13 that the authentication data exists in the HDD 5 that is identical to the authentication data input by the user, the authentication control unit 10 notifies the print processing unit 11 that the identical authentication data exists. The print processing unit 11 notified to that effect controls the print unit 8 and starts printing the image based on the print data corresponding to the identical authentication data at step S14. Upon finishing the printing of the print data, the print processing unit 11 notifies the data management control unit 9 to that effect.

Upon receiving the notification of the finishing of the printing, the data management control unit 9 deletes the print data, the authentication data, and the importance degree data stored in the HDD 5, and the image forming apparatus 1 terminates a series of operations.

As described above, the image forming apparatus 1 deletes the print data stored in the HDD 5 based on the elapsed time measured by the timer 7 and the content of the importance degree data, thus being capable of preventing the print data from being leaked where the user forgets about the existence of the print data, where the user is unable to come to a location of the image forming apparatus 1 due to some causes, or where the image forming apparatus 1 itself is stolen.

The second embodiment of the present invention is hereinafter described in detail. Some of structures of the image forming apparatus of the second embodiment are identical to those of the first embodiment, and thus, the same reference numerals are given to such identical portions to omit the detailed description thereof. Only the different portions are hereinafter described in detail. Specifically, in addition to the operations of the image forming apparatus 1 configuring the time management register for each of the print data, the image forming apparatus of the second embodiment changes a location of storing the print data according to the content of the importance degree data serving as the attribute information and the data deletion criteria as shown in FIG. 6. For example, where the importance degree data shows that the importance degree of the print data is high, the image forming apparatus stores the print data in a volatile memory device losing stored information when the image forming apparatus is turned off, so that the print data is deleted when the image forming apparatus is turned off. On the other hand, where the importance degree data shows that the importance degree of the print data is low, the image forming apparatus stores the print data in a non-volatile memory device maintaining stored information even when the image forming apparatus is turned off. For example, the image forming apparatus of the second embodiment uses a DRAM (Dynamic Random Access Memory) as the volatile memory device and a HDD (Hard Disk Drive) as the non-volatile memory device.

Figure 7:
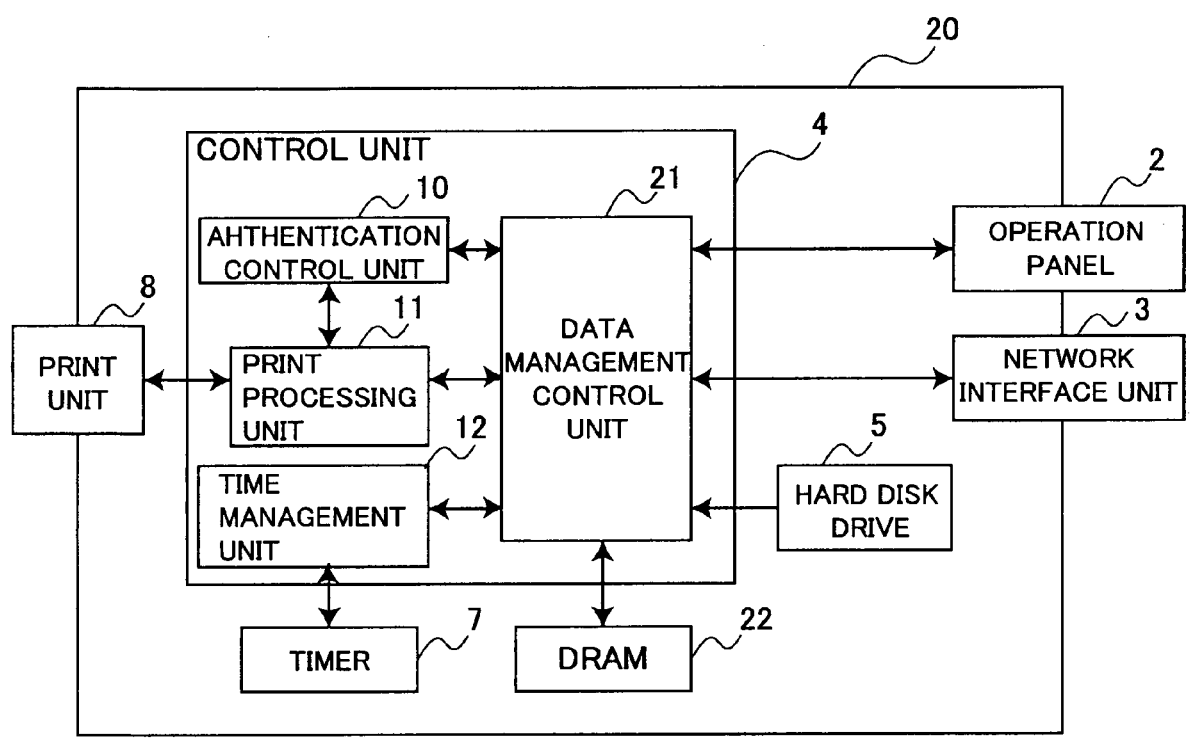
FIG. 7 is a block diagram of the image forming apparatus of the second embodiment for explanation about the structure thereof.

As shown in FIG. 7, an image forming apparatus 20 of the second embodiment has a data management control unit 21 and a DRAM 22 storing the print data.

The data management control unit 21 determines whether to store the print data in either the volatile DRAM 22 or the non-volatile HDD 5 based on the content of the importance degree data, thus determining the processing method of the print data. Then, the data management control unit 21 stores the print data in the HDD 5 or the DRAM 22 based on the determination as to a location of storing the print data. Therefore, the image forming apparatus 20 allows the print data of higher importance degree to be stored in such a way as to be automatically deleted when the image forming apparatus 20 is turned off, and allows the print data of lower importance degree to be stored in such a way as to be maintained even when the image forming apparatus 20 is turned off.

Figure 8:
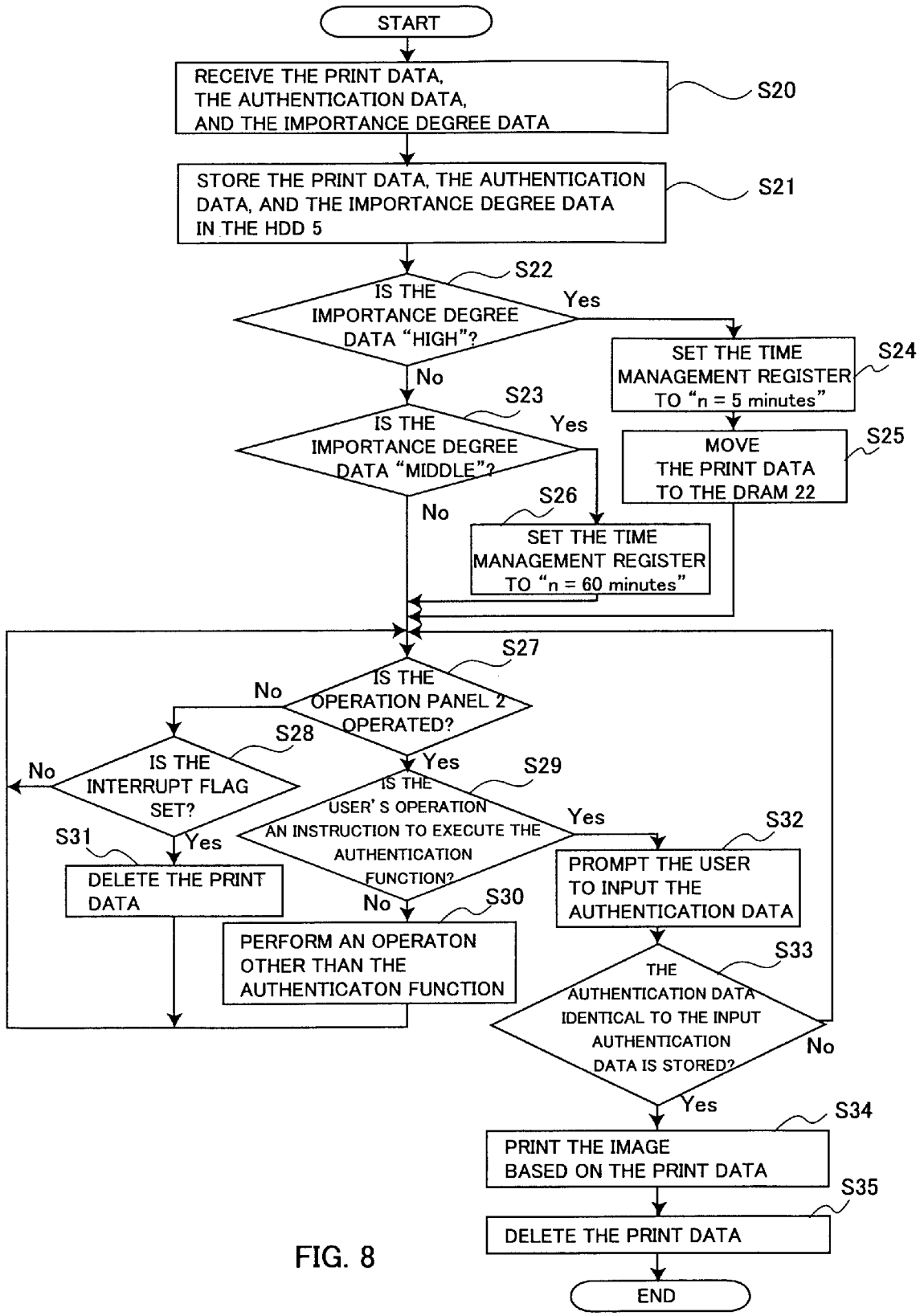
FIG. 8 is a flow chart showing operation of the image forming apparatus of the second embodiment.

Operation of the image forming apparatus 20 is hereinafter described in detail with reference to FIG. 8.

The image forming apparatus 20 starts a series of operations, and receives the print data, the authentication data, and the importance degree data via the network interface unit 3 at step S20. Subsequently, the image forming apparatus 20 performs operations of step S21 and subsequent steps to process the print data, the authentication data, and the importance degree data.

At step S21, the image forming apparatus 1 causes the data management control unit 21 to store in the HDD 5 the print data, the authentication data, and the importance degree data that the network interface unit 3 has received.

At step S22, the data management control unit 21 determines whether the importance degree data corresponding to the received print data is "high". If the data management control unit 21 determines that the importance degree data is not "high", the data management control unit 21 determines whether the importance degree data is "middle" at step S23. If the importance degree data is "high", the data management control unit 21 looks up the data deletion criteria and sets the time management register for the print data to "n=5 minutes" at step S24. Subsequently, the data management control unit 21 moves the print data from the HDD 5 to the DRAM 22 at step S25. At this moment, the print data is deleted from the HDD 5. After the operation of step S25 is performed, the image forming apparatus 20 can automatically delete the print data configured to be the "high" importance degree anytime the image forming apparatus 20 is turned off.

If the importance degree data is "middle", the data management control unit 21 looks up the data deletion criteria and sets the time management register for the print data to "n=60 minutes" at step S26. Subsequently, the image forming apparatus 20 performs steps S27 and subsequent steps to perform printing of the print data and the like. Where the time management register is set at step S24 or step S26, the time management unit 12 configures the above-mentioned software time counter and starts counting elapsed time by periodically increasing the software time counter.

At step S27, the data management control unit 21 determines whether the operation panel unit 2 is operated by the user. If the data management control unit 21 determines that the operation panel unit 2 is not operated, the data management control unit 21 determines at step S28 whether the interruption flag is set by the time management unit 12. If the data management control unit 21 determines that the interrupt flag is not set, step S27 is repeated again, and the above-mentioned steps are repeated unless the user operates the operation panel unit 2 or the time management unit 12 sets the interrupt flag.

Where the user operates the operation panel unit 2 to input a prescribed information to the image forming apparatus 20, the data management control unit 21 determines that the operation panel unit 2 is operated at step S27, and performs step S29 and subsequent steps.

At step S29, the data management control unit 21 determines whether the user's operation is to instruct the execution of the authentication function. If the data management control unit 21 determines that the user's operation with the operation panel unit 2 is not an instruction for executing the authentication function, the apparatus performs an operation other than the execution of the authentication function in accordance with the user's instruction at step S30, and then performs the operation of step S27 again.

If the data management control unit 21 determines that the interruption flag is set by the time management unit 12 at step S28, the data management control unit 9 deletes the print data, the authentication data, and the importance degree data from the HDD 5 according to the data deletion criteria at step S31. Even though the user has not yet manipulated the image forming apparatus 20 until step 28, the image forming apparatus 20 spontaneously deletes the print data based on the importance degree data regardless of whether the print data has been printed or not, thus preventing the print data from being leaked even where the user forgets about the existence of the print data.

If the data management control unit 21 determines that the user's operation is an instruction for executing the authentication function at step S29, the data management control unit 21 notifies the authentication control unit 10 to that effect and prompts the user to input the authentication data at step S32.

The data management control unit 21 determines whether the HDD 5 stores the authentication data identical to the authentication data input to the operation panel unit 2 at step S33. If the data management control unit 21 determines that the HDD 5 does not store the authentication data identical to the authentication data input to the operation panel unit 2, the image forming apparatus 20 repeats the operation of step S27 again.

On the other hand, if the data management control unit 21 determines at step S33 that the authentication data exists in the HDD 5 that is identical to the authentication data input by the user, the authentication control unit 10 notifies the print processing unit 11 that the identical authentication data exists. The print processing unit 11 notified to that effect controls the print unit 8 and starts printing the image based on the print data corresponding to the identical authentication data at step S34. Upon finishing the printing of the print data, the print processing unit 11 notifies the data management control unit 21 to that effect.

Upon receiving the notification of the finishing of the printing, the data management control unit 21 deletes the print data, the authentication data, and the importance degree data stored in the HDD 5, and the image forming apparatus 20 terminates a series of operations. Where the image forming apparatus 20 is turned off, the print data stored in the DRAM 22 is deleted regardless of whether the image based on the print data has been printed or whether the time in the time management register comes. That is, the image forming apparatus 20 can surely delete the print data of high importance degree in situations such as where the image forming apparatus 20 is disposed of.

As describe above, the image forming apparatus 20 stores the print data of high importance degree in the volatile memory device to delete the print data when the image forming apparatus 20 is turned off, thus being capable of preventing the print data from being leaked. Although the image forming apparatus 20 is configured to perform the processing of the print data with the time management register in parallel with the processing of changing the memory device storing the print data, it is also possible to configure the apparatus to perform only the processing of changing the memory device storing the print data depending on the content of the importance degree data.

The third embodiment of the present invention is hereinafter described in detail.

The third embodiment of the present invention is hereinafter described in detail. Some of structures of the image forming apparatus of the third embodiment are identical to those of the first embodiment, and thus, the same reference numerals are given to such identical portions to omit the detailed description thereof. Only the different portions are hereinafter described in detail. Specifically, the image forming apparatus of the third embodiment changes the number of times the print data is allowed to be printed depending on the content of the importance degree data and the data deletion criteria as shown in FIG. 9. For example, where the importance degree data of the print data is high, the image forming apparatus performs the processing of the print data to allow the image based on the print data to be printed only once. On the other hand, where the importance degree data of the print data is low, the image forming apparatus performs the processing of the print data to allow the image based on the print data to be printed multiple number of times.

Figure 10:
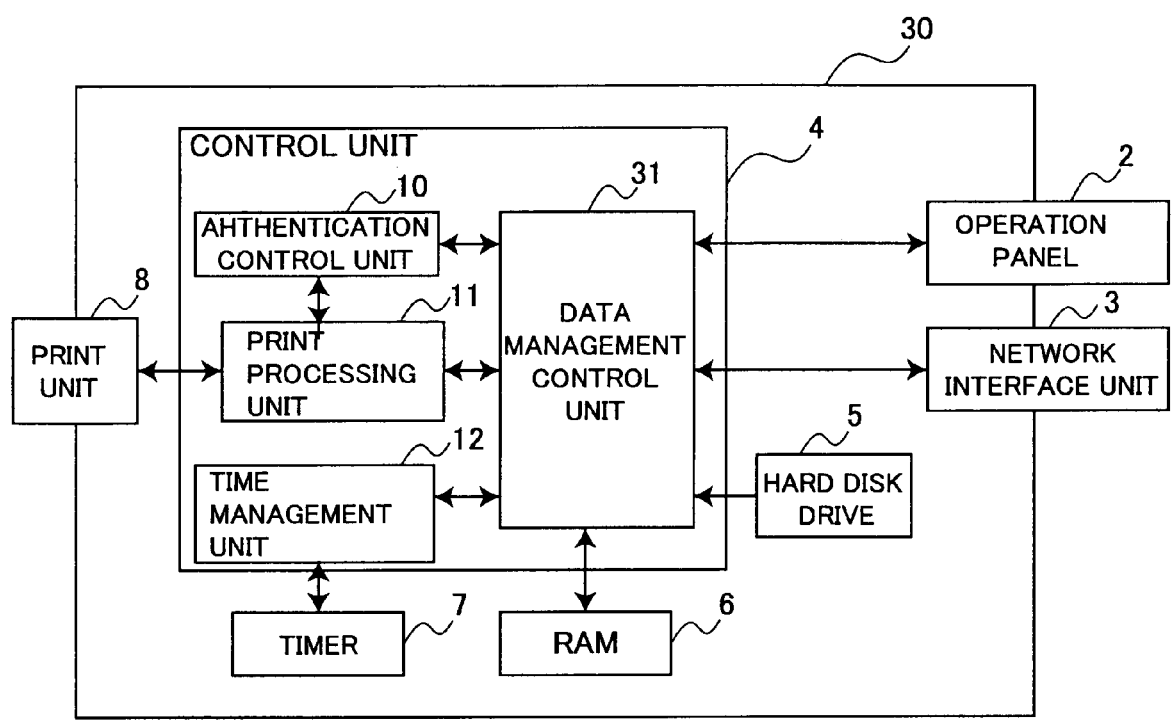
FIG. 10 is a block diagram of the image forming apparatus of the third embodiment for explanation about the structure thereof.

The image forming apparatus 30 of the third embodiment has a data management control unit 31 as shown in FIG. 10.

The data management control unit 31 determines the processing method of the print data by configuring the allowable number of times of printing of the print data based on the content of the importance degree data. The data management control unit 31 counts the number of times of printing of the image based on the print data. The HDD 5 stores as a table shown in FIG. 11 the allowable number of times of printing thus configured by the data management control unit 31. Every time the print data is printed, the data management control unit 31 decreases the allowable number of times of printing in the table by one and rewrites the decreased number thereto. That is, the data management control unit 31 counts the number of times of printing of the print data, subtracts the number of times of printing of the print data from the allowable number of times of printing stored in the HDD 5, and writes back to the HDD 5 the result of the subtraction as the allowable number of times of printing. Where the number of times of printing in the table becomes zero, the data management control unit 31 deletes the print data from the HDD 5. In this way, the image forming apparatus 30 restricts the allowable number of times of printing of the print data depending on the importance degree data of the print data. For example, the image forming apparatus 30 sets the allowable number of times of printing of the print data of high importance degree to a smaller number, sets the allowable number of times of printing of the print data of low importance degree to a larger number, and deletes the print data when the allowable number of times of printing becomes zero, thus preventing the print data from being leaked. As an example of the allowable number of times of printing in the present embodiment, the image forming apparatus 30 sets the allowable number of times of printing to once where the importance degree data of the print data is high, sets the allowable number of times of printing to five times where the importance degree data of the print data is middle. Where the importance degree data is low, the image forming apparatus 30 writes "0FFFFh" as a value of the allowable number of times of printing so as not to restrict the allowable number of times of printing.

Figure 12:
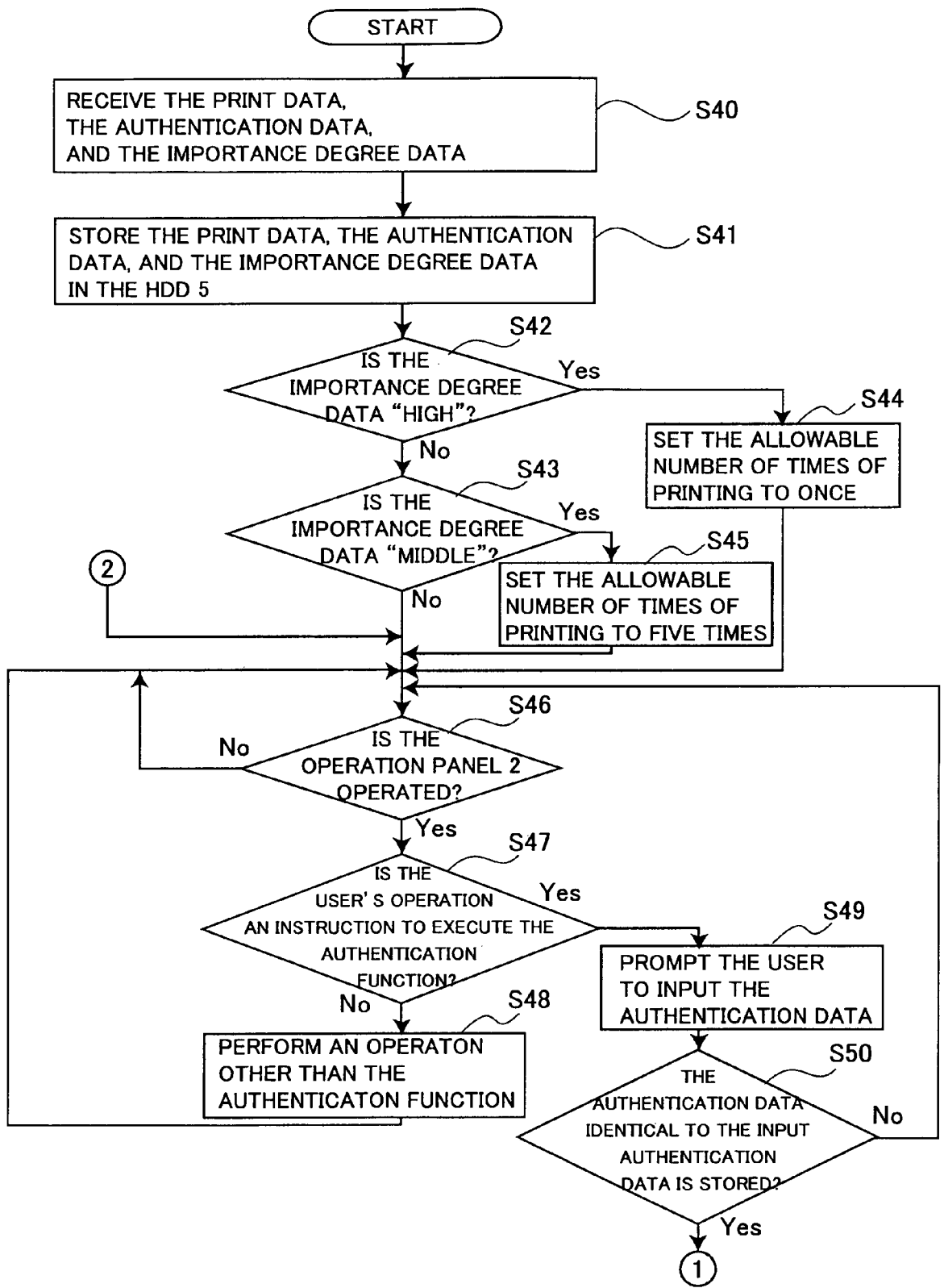
FIG. 12 is a flow chart showing operation of the image forming apparatus of the third embodiment.
Figure 13:
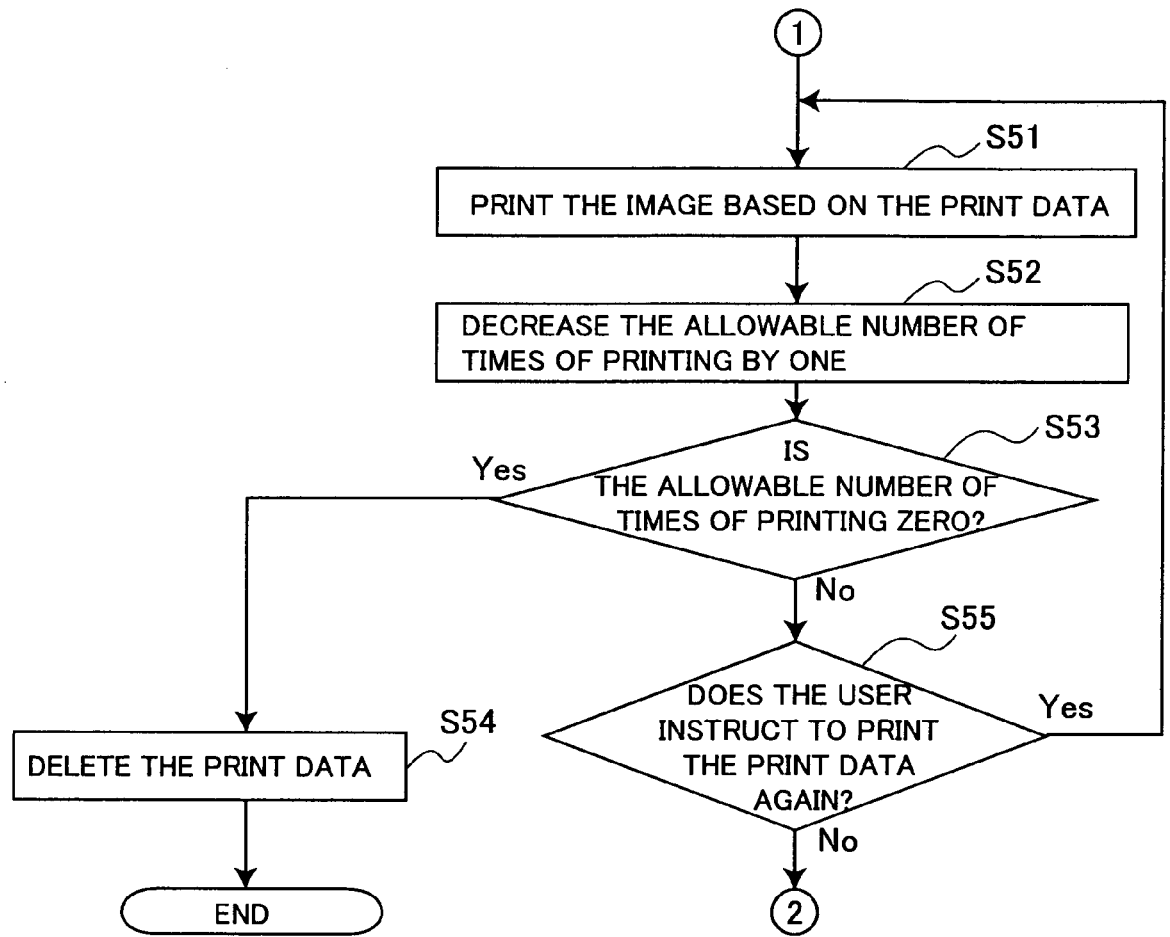
FIG. 13 is a flow chart showing operation of the image forming apparatus of the third embodiment.

Operation of the image forming apparatus 30 is hereinafter described in detail with reference to FIG. 11 and FIG. 12.

The image forming apparatus 30 starts a series of operations, and receives the print data, the authentication data, and the importance degree data via the network interface unit 3 at step S40. Subsequently, the image forming apparatus 30 performs operations of step S41 and subsequent steps to process the print data, the authentication data, and the importance degree data.

At step S41, the image forming apparatus 30 causes the data management control unit 31 to store in the HDD 5 the print data, the authentication data, and the importance degree data that the network interface unit 3 has received.

At step S42, the data management control unit 31 determines whether the importance degree data corresponding to the received print data is "high". If the data management control unit 31 determines that the importance degree data is not "high", the data management control unit 31 determines whether the importance degree data is "middle" at step S43. If the importance degree data is "high", the data management control unit 31 looks up the data deletion criteria and sets the allowable number of times of printing of the print data to once at step S44. If the importance degree data is "middle", the data management control unit 31 looks up the data deletion criteria and sets the allowable number of times of printing of the print data to five times at step S45. Subsequently, the image forming apparatus 20 performs step S46 and subsequent steps to perform printing of the print data and the like.

At step S46, the data management control unit 31 determines whether the operation panel unit 2 is operated by the user. The data management control unit 31 repeats the operation of step S46 until the user operates the operation panel unit 2 to wait until the user inputs an instruction.

At step S47, the data management control unit 31 determines whether the user's operation is to instruct the execution of the authentication function. If the data management control unit 31 determines that the user's operation with the operation panel unit 2 is not an instruction for executing the authentication function, the apparatus performs an operation other than the execution of the authentication function in accordance with the user's instruction at step S48, and then performs the operation of step S46 again.

If the data management control unit 31 determines that the user's operation is an instruction for executing the authentication function at step S47, the data management control unit 31 notifies the authentication control unit 10 to that effect and prompts the user to input the authentication data at step S49.

The data management control unit 31 determines whether the HDD 5 stores the authentication data identical to the authentication data input to the operation panel unit 2 at step S50. If the data management control unit 31 determines that the HDD 5 does not store the authentication data identical to the authentication data input to the operation panel unit 2, the image forming apparatus 30 repeats the operation of step S46 again.

On the other hand, if the data management control unit 21 determines at step S50 that the authentication data exists in the HDD 5 that is identical to the authentication data input by the user, the authentication control unit 10 notifies the print processing unit 11 that the identical authentication data exists. The print processing unit 11 notified to that effect controls the print unit 8 and starts printing the image based on the print data corresponding to the identical authentication data at step S51. Upon finishing the printing of the print data, the print processing unit 11 notifies the data management control unit 31 to that effect.

Upon receiving the notification of the finishing of the printing, the data management control unit 31 looks up the allowable number of times of printing configured for the print data and decreases the allowable number of times of printing by one. If the allowable number of times of printing configured for the print data is "0FFFFh", the data management control unit 31 does not decrease the allowable number of times of printing.

Upon receiving the notification of the finishing of the printing, the data management control unit 31 determines whether the allowable number of times of printing of the print data stored in the HDD 5 is a value zero. If the data management control unit 31 determines that the allowable number of times of printing is zero, the data management control unit 31 deletes the print data, the authentication data, and the importance degree data stored in the HDD 5 at step S54, and the image forming apparatus 30 terminates a series of operations.

If the data management control unit 31 determines that the allowable number of times of printing is not zero, the data management control unit 31 displays a message on the display unit of the operation panel unit 2 to ask the user to decide whether or not to print the print data again. The data management control unit 31 determines at step S55 whether a response from the user is to print the print data again. If the response from the user is not to print the print data again, the data management control unit 31 performs the operation of step S46 to wait for the instruction from the user. On the other hand, if the response from the user is to print the print data again, the image forming apparatus 30 performs the step S51 and subsequent steps.

As described above, the image forming apparatus 30 sets the allowable number of times of printing of the print data of high importance degree to a smaller number, sets the allowable number of times of printing of the print data of low importance degree to a larger number, and deletes the print data when the allowable number of times of printing becomes zero, thus preventing the print data from being printed more than necessary and preventing the print data and paper printed with the print data thereon from being leaked.

This invention is not limited to the above-described embodiments, and the embodiments can be arbitrary changed and modified without departing from the subject-matter of the invention.

Especially, although four-digit numerals are used as the authentication data in the embodiments described above in detail, the authentication may also be performed with biometrics information such as finger prints, iris patterns, and the like. Furthermore, although the time management register is set to either of "n=0 minute", "n=5 minutes", or "n=60 minutes" according to the data deletion criteria for three levels of importance degree in the embodiments described above in detail, the number of levels of the importance degree and the time in the time management register can be changed.

Although the image forming apparatus 1 increases the software time counter representing the time for which the print data is stored in the HDD 5 to delete the print data when the software time counter exceeds the value in the time management register, the apparatus may also decrease the software time counter representing the time for which the print data is stored in the HDD 5.

In the third embodiment of the invention, the image forming apparatus 30 sets the allowable number of times of printing of the print data according to the content of the importance degree data. However, instead of the image forming apparatus 30, the information processing apparatus may also attach and transmit information as to the allowable number of times of printing to the image forming apparatus 30.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus having an authenticated printing function, comprising:
   a memory unit storing print data in either a first region or a second region, first authentication data authenticating the print data, and attribute data relating to a degree of importance of the print data, the degree of importance of the print data being selected from a set of importance levels, a respective predetermined time being associated with each of the importance levels, the first region losing information stored therein when the image forming apparatus is turned off and the second region maintaining information stored therein when the image forming apparatus is turned off;
   a data input unit inputting the print data, the first authentication data, and the attribute data to the memory unit;
   an authentication data comparison unit comparing the first authentication data stored in the memory unit with second authentication data authenticating the print data;
   an authentication data input unit inputting the second authentication data to the authentication data comparison unit;
   a control unit controlling a process of printing according to the print data stored in the memory unit, based on a result of the comparison in the authentication data comparison unit, the control unit determining that the print data is to be stored either in the first region or in the second region based on the attribute data relating to the degree of importance of the print data stored in the memory unit; and
   a timer unit measuring the time that has elapsed while the memory unit stores the print data,
   wherein the control unit deletes the print data from the memory unit when the elapsed time exceeds the predetermined time associated with the degree of importance of the print data.

2. The image forming apparatus according to claim 1, wherein the timer unit includes a real time clock that measures the elapsed time when the image forming apparatus is turned off.

3. The image forming apparatus according to claim 1, wherein a predetermined time for first print data with a first degree of importance that is higher than a second degree of importance is set to be shorter than a predetermined time for second print data with the second degree of importance.

4. The image forming apparatus according to claim 1, wherein a predetermined time, associated with a first degree of importance that is higher than a second degree of importance, is set shorter than a predetermined time associated with the second degree of importance.

5. The image forming apparatus according to claim 1, wherein first print data, which has a first degree of importance that is higher than a predetermined level, is stored in the first region, and second print data, which has a second degree of importance that is lower than the predetermined level, is stored in the second region.

* * * * *